United States Patent
Pelaez et al.

(10) Patent No.: US 12,499,791 B2
(45) Date of Patent: Dec. 16, 2025

(54) TERMINAL APPARATUS, METHOD, AND NON-TRANSITORY COMPUTER READABLE MEDIUM FOR DISPLAYING STEREOSCOPIC IMAGES USING LIGHT FIELD DISPLAY

(71) Applicant: TOYOTA JIDOSHA KABUSHIKI KAISHA, Toyota (JP)

(72) Inventors: Jorge Pelaez, Kawaguchi (JP); Pacharapon Leewanichakul, Koganei (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 18/543,127

(22) Filed: Dec. 18, 2023

(65) Prior Publication Data
US 2024/0221549 A1    Jul. 4, 2024

(30) Foreign Application Priority Data
Dec. 28, 2022   (JP) ................. 2022-212673

(51) Int. Cl.
| G09G 3/00 | (2006.01) |
| H04N 13/117 | (2018.01) |
| H04N 13/349 | (2018.01) |
| H04N 13/366 | (2018.01) |

(52) U.S. Cl.
CPC ........... *G09G 3/003* (2013.01); *H04N 13/117* (2018.05); *H04N 13/349* (2018.05); *H04N 13/366* (2018.05); *G09G 2354/00* (2013.01)

(58) Field of Classification Search
CPC .. G09G 3/003; G09G 2354/00; H04N 13/117; H04N 13/349; H04N 13/366; H04N 13/275; H04N 13/111; H04N 13/204; H04N 13/30
See application file for complete search history.

(56) References Cited

U.S. PATENT DOCUMENTS

| 8,994,759 B2 * | 3/2015 | Hamagishi .......... G02B 30/27 345/690 |
| 10,397,541 B2 * | 8/2019 | Park .................. H04N 13/368 |
| 12,260,490 B2 * | 3/2025 | Akao ..................... G06T 7/70 |

(Continued)

FOREIGN PATENT DOCUMENTS

| JP | 5710330 B2 | 4/2015 |
| JP | 2017-038367 A | 2/2017 |
| JP | 2021-189279 A | 12/2021 |

*Primary Examiner* — Vijay Shankar
(74) *Attorney, Agent, or Firm* — Oliff PLC (57) ABSTRACT

A terminal apparatus includes an imager configured to capture an image of a user, a display including a display plane configured to output light rays constituting respective element images of a plurality of viewpoint positions with respect to a stereoscopic image for displaying the stereoscopic image, toward each viewpoint position, and a controller configured to control the display to output light rays constituting a first number of element images when a distance of the user from the display plane, which is obtained from the captured image of the user, is a first distance, and to output light rays constituting a second number of element images when the distance of the user is a second distance larger than the first distance, the second number being smaller than the first number.

9 Claims, 5 Drawing Sheets

(56) References Cited

U.S. PATENT DOCUMENTS

| | | |
|---|---|---|
| 2012/0242569 A1 | 9/2012 | Hamagishi |
| 2017/0041596 A1 | 2/2017 | Park et al. |
| 2023/0014562 A1* | 1/2023 | Akao ........................ G09G 5/02 |

* cited by examiner

TERMINAL APPARATUS, METHOD, AND NON-TRANSITORY COMPUTER READABLE MEDIUM FOR DISPLAYING STEREOSCOPIC IMAGES USING LIGHT FIELD DISPLAY

CROSS-REFERENCE TO RELATED APPLICATION

This application claims priority to Japanese Patent Application No. 2022-212673, filed on Dec. 28, 2022, the entire contents of which are incorporated herein by reference.

TECHNICAL FIELD

The present disclosure relates to a terminal apparatus.

BACKGROUND

As an example of technology to support a user experience in virtual or augmented reality, various technologies have been proposed to display a stereoscopic image of an object in order to improve a realistic feel of a user experience. For example, Patent Literature (PTL) 1 discloses a technology related to heads-up displays that display a stereoscopic image of an object using the light field method.

CITATION LIST

Patent Literature

PTL 1: JP 2021-189279 A

SUMMARY

There is room for further improving efficiency in processing related to displaying of stereoscopic images when employing an apparatus for the light field method.

It would be helpful to provide a terminal apparatus or the like that enables to further improve efficiency in processing related to displaying of stereoscopic images.

A terminal apparatus in the present disclosure includes:
an imager configured to capture an image of a user;
a display including a display plane configured to output light rays constituting respective element images of a plurality of viewpoint positions with respect to a stereoscopic image for displaying the stereoscopic image, toward each viewpoint position; and
a controller configured to control the display to output light rays constituting a first number of element images when a distance of the user from the display plane, which is obtained from the captured image of the user, is a first distance, and to output light rays constituting a second number of element images when the distance of the user is a second distance larger than the first distance, the second number being smaller than the first number.

According to the terminal apparatus or the like in the present disclosure, it is possible to further improve efficiency in processing related to displaying of stereoscopic images.

BRIEF DESCRIPTION OF THE DRAWINGS

In the accompanying drawings.

DETAILED DESCRIPTION

Figure 1:
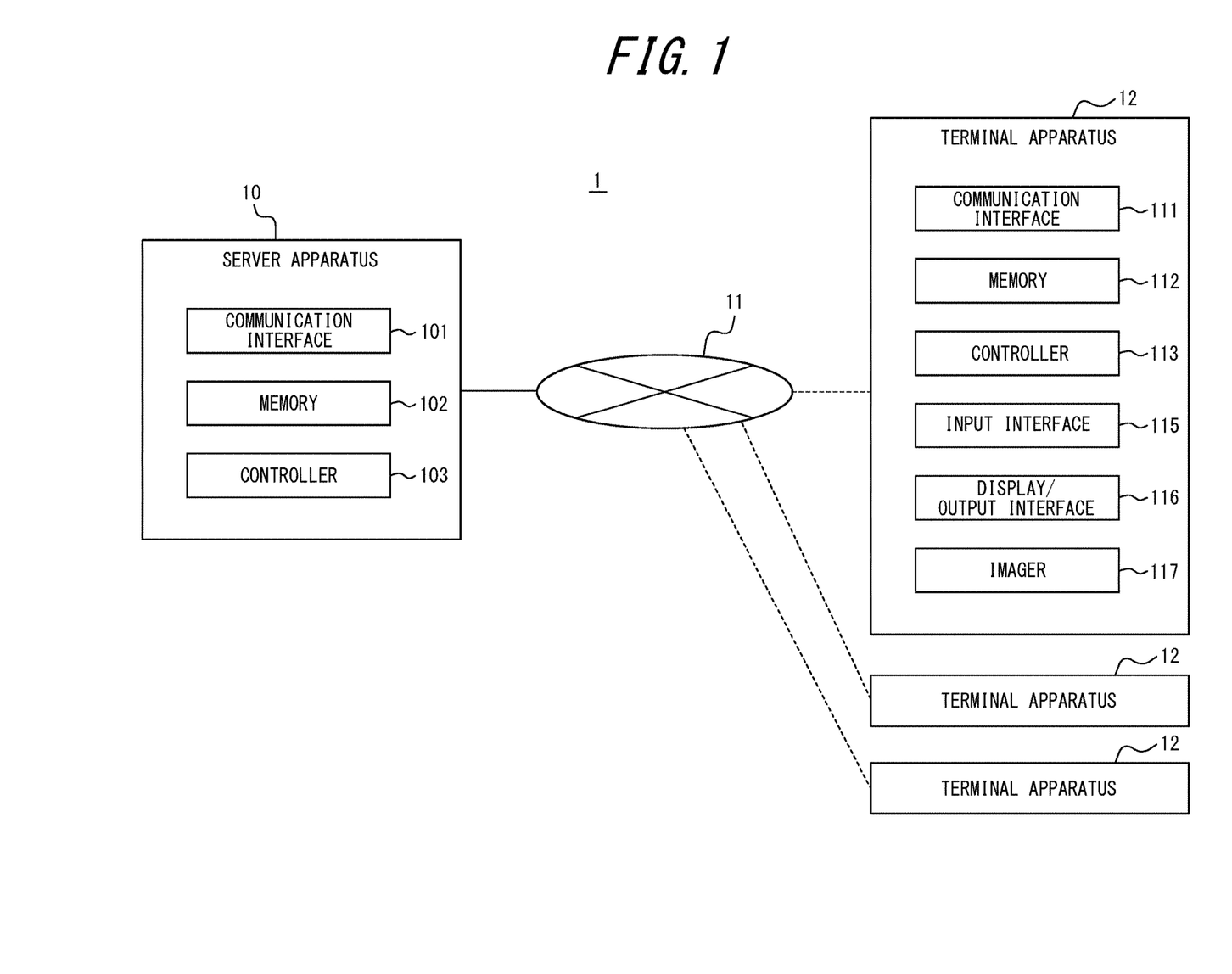
FIG. 1 is a diagram illustrating an example configuration of a virtual event provision system.

FIG. 1 illustrates an example configuration of a virtual event provision system including a terminal apparatus in an embodiment. In the virtual event provision system 1, a plurality of terminal apparatuses 12 and a server apparatus 10 are communicably connected to each other via a network 11. The virtual event provision system 1 is a system for providing events in a virtual space, i.e., virtual events, in which users can participate using the terminal apparatuses 12. The virtual events are events in which a plurality of users communicates information by speech or the like in a virtual space, and each user is represented by a 3D model.

The server apparatus 10 is, for example, a server computer that belongs to a cloud computing system or other computing system and functions as a server that implements various functions. The server apparatus 10 may be configured by two or more server computers that are communicably connected to each other and operate in cooperation. The server apparatus 10 transmits and receives, and performs information processing on, information necessary to provide virtual events.

Each terminal apparatus 12 is an information processing apparatus provided with communication functions and is used by a user who participates in a virtual event provided by the server apparatus 10. The terminal apparatus 12 is, for example, an information processing terminal, such as a smartphone or a tablet terminal, or an information processing apparatus, such as a personal computer.

The network 11 may, for example, be the Internet or may include an ad hoc network, a local area network (LAN), a metropolitan area network (MAN), other networks, or any combination thereof.

In the present embodiment, the terminal apparatus 12 includes an imager 117 that images a user, a display/output interface 116, and a controller 113. The display/output interface 116 outputs light rays constituting respective element images of a plurality of viewpoint positions with respect to the stereoscopic image for displaying the stereoscopic image, toward each viewpoint position. The controller 113 controls the display to output light rays constituting a first number of element images when a distance of the user from the display plane, which is obtained from the captured image of the user, is a first distance, and to output light rays constituting a second number of element images when the distance of the user is a second distance larger than the first distance, the second number being smaller than the first number.

When multiple users participate in a virtual event conducted by server apparatus 10 on the network using terminal apparatus 12 respectively, a virtual space image including a 3D model based on each user's captured image is displayed on each terminal apparatus 12. The controller 113 renders multiple element images when rendering the virtual space images, which imposes a reasonable processing load. The controller 113 of the present embodiment can reduce the processing load by decreasing the number of element images to be rendered according to the user's position with respect to the display plane. Thus, it is possible to improve the efficiency of processing related to the display of stereoscopic images.

Respective configurations of the server apparatus 10 and the terminal apparatuses 12 are described in detail.

The server apparatus 10 includes a communication interface 101, a memory 102, and a controller 103. These configurations are appropriately arranged on two or more computers in a case in which the server apparatus 10 is configured by two or more server computers.

The communication interface 101 includes one or more interfaces for communication. The interface for communication is, for example, a LAN interface. The communication interface 101 receives information to be used for the operations of the server apparatus 10 and transmits information obtained by the operations of the server apparatus 10. The server apparatus 10 is connected to the network 11 by the communication interface 101 and communicates information with the terminal apparatuses 12 via the network 11.

The memory 102 includes, for example, one or more semiconductor memories, one or more magnetic memories, one or more optical memories, or a combination of at least two of these types, to function as main memory, auxiliary memory, or cache memory. The semiconductor memory is, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EEPROM). The memory 102 stores information to be used for the operations of the server apparatus 10 and information obtained by the operations of the server apparatus 10.

The controller 103 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated circuit is, for example, a field-programmable gate array (FPGA), an application specific integrated circuit (ASIC), or the like. The controller 103 executes information processing related to the operations of the server apparatus 10 while controlling components of the server apparatus 10.

The functions of the server apparatus 10 are realized by a processor included in the controller 103 executing a control program. The control program is a program for causing a computer to function as the server apparatus 10. Some or all of the functions of the server apparatus 10 may be realized by a dedicated circuit included in the controller 103. The control program may be stored on a non-transitory recording/storage medium readable by the server apparatus 10 and be read from the medium by the server apparatus 10.

Each terminal apparatus 12 includes a communication interface 111, a memory 112, a controller 113, an input interface 115, a display/output interface 116, and an imager 117.

The communication interface 111 includes a communication module compliant with a wired or wireless LAN standard, a module compliant with a mobile communication standard such as LTE, 4G, or 5G, or the like. The terminal apparatus 12 connects to the network 11 via a nearby router apparatus or mobile communication base station using the communication interface 111 and communicates information with the server apparatus 10 and the like over the network 11.

The memory 112 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 112 functions as, for example, a main memory, an auxiliary memory, or a cache memory. The memory 112 stores information to be used for the operations of the controller 113 and information obtained by the operations of the controller 113.

The controller 113 has one or more general purpose processors, such as CPUs or Micro Processing Units (MPUs), or one or more dedicated processors, such as GPUs, that are dedicated to specific processing. Alternatively, the controller 113 may have one or more dedicated circuits such as FPGAs or ASICs. The controller 113 is configured to perform overall control of the operations of the terminal apparatus 12 by operating according to the control/processing programs or operating according to operating procedures implemented in the form of circuits. The controller 113 then transmits and receives various types of information to and from the server apparatus 10 and the like via the communication interface 111 and executes the operations according to the present embodiment.

The input interface 115 includes one or more interfaces for input. The interface for input may include, for example, a physical key, a capacitive key, a pointing device, and/or a touch screen integrally provided with a display. The interface for input may also include a microphone that accepts audio input. The interface for input may further include a scanner, camera, or IC card reader that scans an image code. The input interface 115 accepts the operations for inputting information to be used in the operations of the controller 113 and transmits the inputted information to the controller 113.

The display/output interface 116 includes one or more output interfaces for outputting information generated by the operation of the controller 113. The interface for output may include, for example, a display and a speaker. The display is a light field display that corresponds to the "display" of the present embodiment.

The imager 117 includes a camera that captures an image of a subject using visible light and a distance measuring sensor that measures the distance to the subject to acquire a distance image. The camera captures a subject at, for example, 15 to 30 frames per second to produce a moving image formed by a series of captured images. Distance measurement sensors include Time of Flight (ToF) cameras, Light Detection And Ranging (LiDAR), and stereo cameras and generate distance images of a subject that contain distance information. The imager 117 transmits the captured images and the distance images to the controller 113.

The functions of the controller 113 are realized by a processor included in the controller 113 executing a control program. The control program is a program for causing the processor to function as the controller 113. Some or all of the functions of the controller 113 may be realized by a dedicated circuit included in the controller 113. The control program may be stored on a non-transitory recording/storage medium readable by the terminal apparatus 12 and be read from the medium by the terminal apparatus 12.

In the present embodiment, the controller 113 acquires a captured image and a distance image of the user of the terminal apparatus 12 with the imager 117 and collects audio of the speech of the user with the microphone of the input interface 115. The controller 113 encodes the captured image and distance image of the user, which are for generating a 3D model representing the user, and audio information, which is for reproducing the user's speech, to generate encoded information. The controller 113 may perform any appropriate processing (such as resolution change and trimming) on the captured images and the like at the time of encoding. The controller 113 uses the communication interface 111 to transmit the encoded information to the other terminal apparatus 12 via the server apparatus 10.

The controller 113 also receives the encoded information, transmitted from the other terminal apparatus 12 via the server apparatus 10, using the communication interface 111. Upon decoding the encoded information received from the other terminal apparatus 12, the controller 113 uses the decoded information to generate a 3D model representing the user who uses the other terminal apparatus 12 and places the 3D model in the virtual space. The controller 113 generates the virtual space images including the 3D model from a given viewpoint in the virtual space by rendering. The virtual space image includes respective element images of a plurality of viewpoint positions with respect to the light field display. In other words, the controller 113 renders multiple element images. The controller 113 outputs the virtual space image to the display/output interface 116. The display/output interface 116 displays virtual space images by outputting light rays comprising multiple element images to each viewpoint position and outputs speech sounds based on each user's voice information.

These operations of the controller 113 and the like enable the user of the terminal apparatus 12 to participate in the virtual event and talk with other users in real time.

Figure 2A:
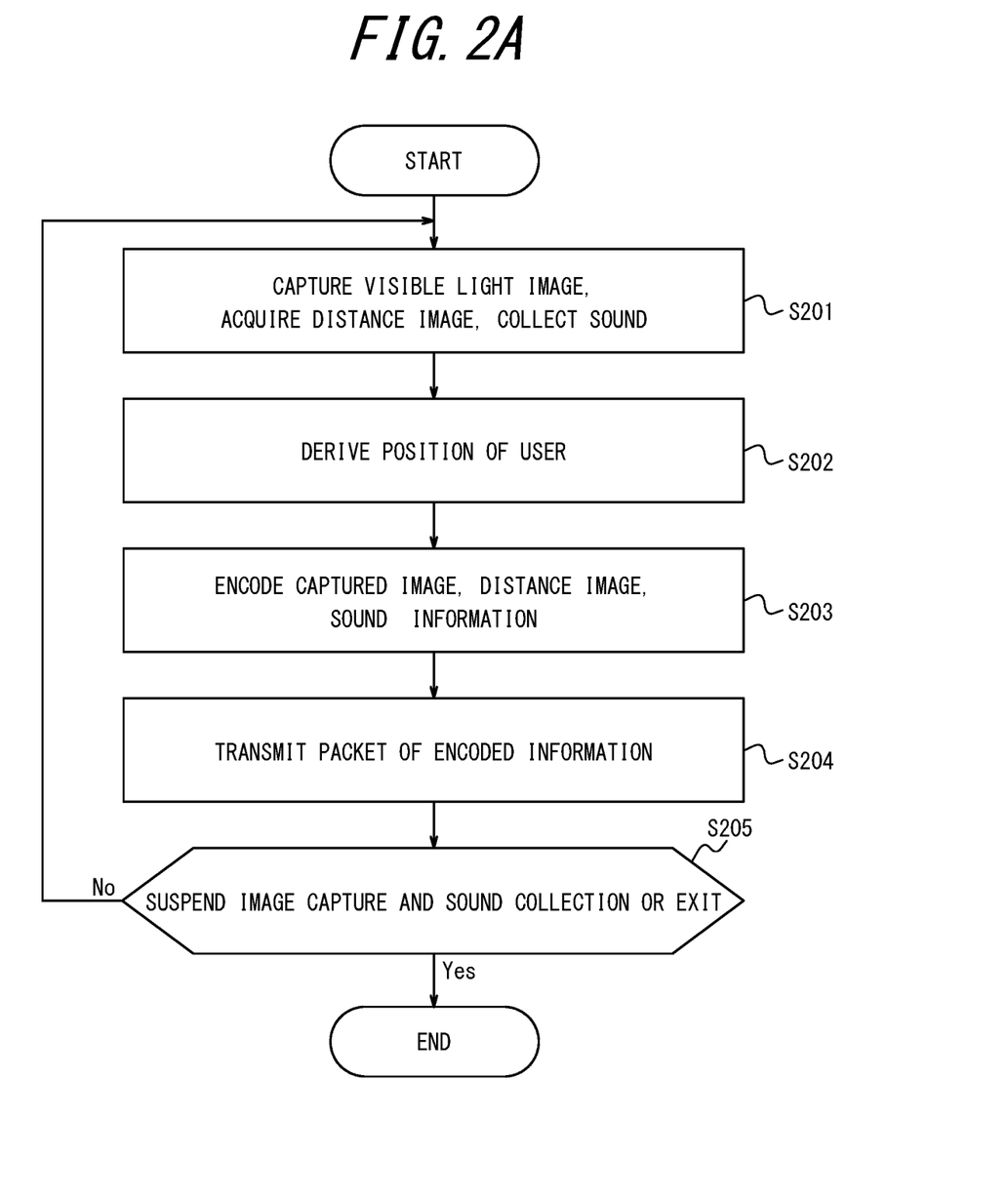
FIG. 2A is a flowchart illustrating an example of operations of a terminal apparatus.
Figure 2B:
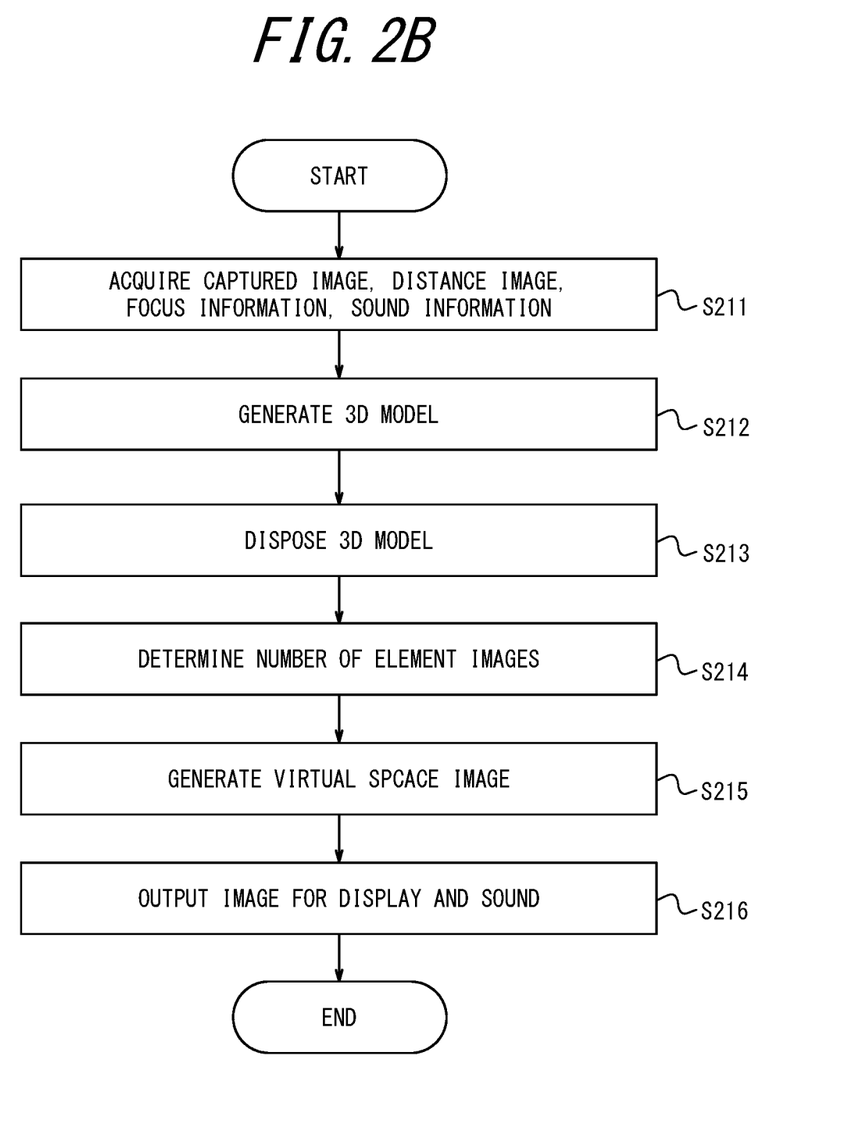
FIG. 2B is a flowchart illustrating an example of operations of a terminal apparatus.

FIGS. 2A and 2B are flowcharts illustrating the operating procedures of the terminal apparatus 12 for conducting a virtual event. The server apparatus 10 mediates the communication of a plurality of terminal apparatuses 12 on the network 11 to allow communication between the terminal apparatuses 12, thereby enabling the virtual events to take place.

The procedures in FIG. 2A relates to the operating procedures of the controller 113 when each terminal apparatus 12 transmits information for generating a 3D model of the user who uses that terminal apparatus 12.

In step S201, the controller 113 captures visible light images and acquires distance images of the corresponding user at an appropriately set frame rate using the imager 117 and collects audio of the corresponding user's speech using the input interface 115. The controller 113 acquires the image captured by visible light and the distance image from the imager 117 and the audio information from the input interface 115.

In step S202, the controller 113 derives the position of the user. The user's position is identified by the spatial coordinates of any part of the user's face that can be image-recognized. An optional site is, for example, the midpoint between either eye or both eyes. The controller 113 recognizes users and their facial parts through image processing such as pattern matching on captured images. Based on the distance image, the controller 113 derives the spatial coordinates of, for example, the user's eye with respect to the position of the camera of the imager 117. The controller 113 derives the user's position based on the spatial coordinates obtained.

In step S203, the controller 113 encodes the captured image, the distance image, and the speech information to generate the encoded information.

In step S204, the controller 113 converts the encoded information into packets using the communication interface 111 and transmits the packets to the server apparatus 10 for the other terminal apparatus 12.

Upon acquiring information input in response to the operation to suspend image capture and sound collection or to exit the virtual event (Yes in S205), the controller 113 terminates this processing procedure. While not acquiring information that corresponds to the operation for suspension or exit (No in S205), the controller 113 executes steps S201 to S204 to derive the user's gazing point and transmit information for generating a 3D model representing the user and information for outputting audio.

The procedure in FIG. 2B relates to the operating procedure of the controller 113 when the terminal apparatus 12 outputs a virtual event image and audio of other users. Upon receiving, via the server apparatus 10, a packet transmitted by the other terminal apparatus 12 performing the procedures in FIG. 2A, the controller 113 performs steps S211 to S213.

In step S211, the controller 113 decodes the encoded information included in the packet received from the other terminal apparatus 12 to acquire the captured image, distance image and speech information.

In step S212, the controller 113 generates a 3D model representing another user based on the captured image and the distance image. In generating the 3D model, the controller 113 generates a polygon model using the distance images of the other user and applies texture mapping to the polygon model using the captured images of the other user, thereby generating the 3D model of the other user. This example is not limiting, however, and any appropriate method can be used to generate the 3D model.

In the case of receiving information from the terminal apparatuses 12 of a plurality of other users, the controller 113 executes steps S211 to S212 for each other terminal apparatus 12 to generate the 3D model of each user.

In step S213, the controller 113 places the 3D model representing each user in the virtual space where the virtual event is held. The controller 113 places the generated 3D models of the other users at the coordinates in the virtual space. The memory 112 stores information on the coordinates of the virtual space and the coordinates at which each user's 3D model should be placed. For example, each user's 3D model is assigned a placement according to the order in which each user logs into the virtual event. Alternatively, the 3D model can be moved in the virtual space by each user's operation, in which case the 3D model is assigned a position according to the user's operation.

In step S214, the controller 113 determines the number of element images. The controller 113 determines the number of element images according to the user's position.

In step S215, the controller 113 renders and generates a virtual space image obtained by capturing an image of one or more 3D models placed in the virtual space from a virtual viewpoint. The virtual space image contains multiple element images. The controller 113 generates the number of element images derived in step S214.

In step S216, the controller 113 displays the virtual space image and outputs speech using the display/output interface 116. In other words, the controller 113 outputs information to the display/output interface 116 for displaying a virtual space image in which the 3D models are placed in the virtual space in order to control the display to output the light rays constituting the number of element images derived in step S214. The display/output interface 116 displays the virtual space images and also outputs audio.

Figure 3A:
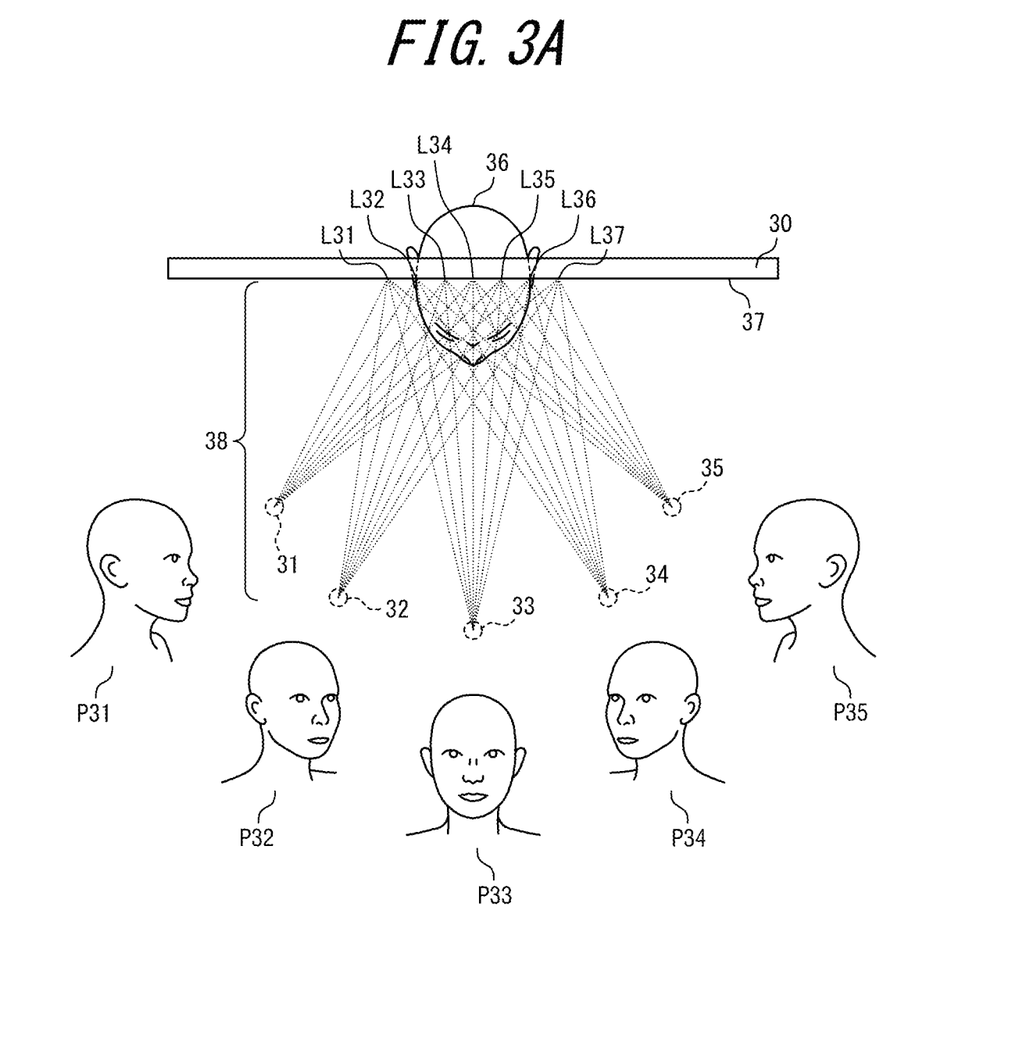
FIG. 3A is a diagram illustrating examples of element images.

FIG. 3A is a schematic plan view showing examples of elemental images that make up the virtual space image. Here, an example is shown where the light field display 30 displays a stereoscopic image 36 near the center of its display plane 37, and outputs five elemental images P31-P35 to the five viewpoint positions 31-35 with respect to the stereoscopic image 36. The stereoscopic image 36 is, for example, an image of the head including the face of a person. On the display plane 37, a number of microlenses L31-L37 are arranged, each corresponding to a number of pixels. Microlenses L31-L37 output light rays to compose elemental images P31-P35 output by their corresponding pixels as a group of light rays 38 at different angles to the center of the display plane 37. The light rays 38 is output at angles such that they constitute elemental images P31-P35 at viewpoint positions 31-35, respectively. The user perceives the elemental images P31-P35 at viewpoint positions 31-35, respectively, and perceives the stereoscopic image 36. For example, the element images P31-P35 correspond to the stereoscopic image 36 from the right side closer, right diagonal, front, left diagonal, and right side closer. It goes without saying that the number of element images and the number of microlenses shown here are simplified examples, and both are not limited to the examples shown here. The microlenses may be, for example, lenticular lenses that extend in the vertical direction of the display plane 37 and correspond to pixels arranged in the extended direction.

Figure 3B:
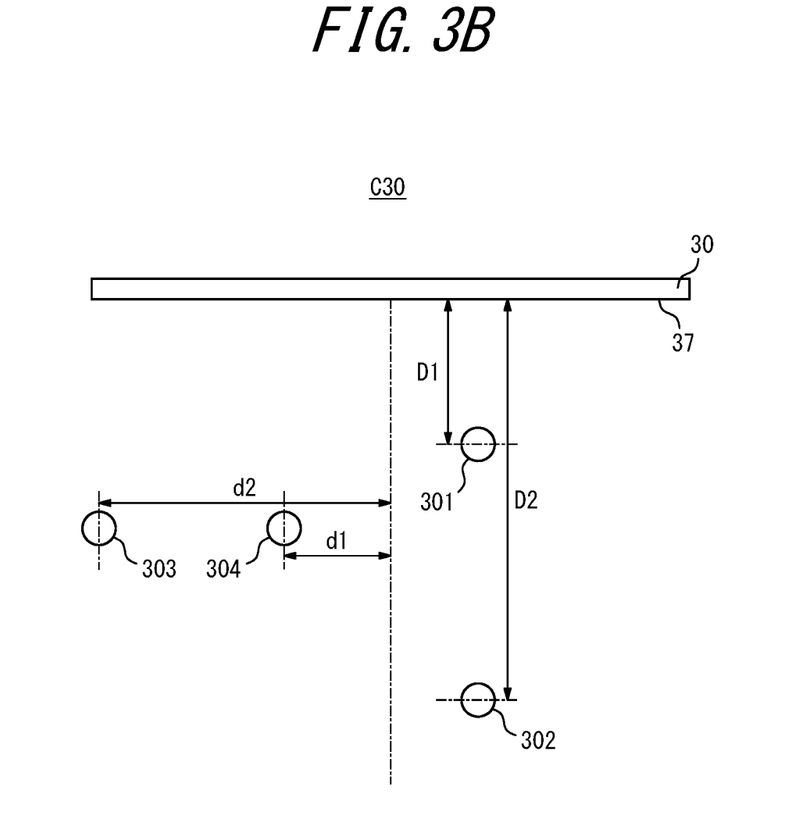
FIG. 3B is a diagram illustrating examples of user positions with respect to a display.

FIG. 3B shows examples 301-304 of user positions with respect to the display plane 37 of the light field display 30. Based on the user's position, the controller 113 derives the distance of the user's positions 301 and 302 from the display plane 37. Examples of distances D1 and D2 (D2>D1) are shown here. The controller 113 also derives the distance of the user's positions 304 and 303 from the center C30 of the display plane 37. Here are examples of distances d1 and d2 (d2>d1) with respect to center C30.

The controller 113 determines the number of element images so that the number of element images at a distance D2 greater than D1 is less than the number of element images at a distance D1 when the distance of the user's position from the display plane 37 is D1. Furthermore, the controller 113 determines the number of element images so that the number of element images at a distance d2 greater than d1 is greater than the number of element images at a distance d1 when the distance from the center C30 of the display plane 37 of the user position is d1. Any means can be used to determine such elemental images according to the user's position. For example, the range of distance values from the display plane 37 of the user's position, the range of distance values from the center C30 of the display plane 37, and the number of element images is pre-correlated and stored in memory 112, and the controller 113 can read out the number of element images corresponding to the user's position from memory 112 to determine the number of element images. Alternatively, the controller 113 may determine the number of element images by multiplying the number of element images determined arbitrarily in advance by a factor that decreases with distance from the display plane 37 of the user's position and increases with distance from the center C30 of the display plane 37. In such a case, it is possible to attach a weight to the distance from the display plane 37 that is greater than the distance from the center C30 of the display plane 37. The controller 113 generates the element images below the number of viewpoint positions to which the light rays 38 are directed. The controller 113 may reduce the number of element images, for example, by having light rays output to compose the same element image toward plurality of adjacent viewpoint positions.

The farther the user's position is from the display plane 37, the fewer the number of elemental images that must be viewed to perceive the stereoscopic image 36 when the user moves parallel to the display plane 37. Thus, the control such that fewer element images are generated when the user's position is farther from the display plane 37 reduces the processing load on the controller 113 compared to the case where a constant number or more of element images are generated at all times.

The light rays output at multiple angles from microlenses placed on the display plane 37 have a greater risk of interfering with rays from adjacent microlenses and reducing light intensity as the angle to the vertical direction of the display plane 37 increases. Then, when the stereoscopic image 36 is displayed near the center C30 of the display plane 37, the farther the user's position is from the center C30, that is, the greater the angle of the light rays directed at the user's position to the vertical direction of the display plane 37, the blurrier the elemental images composed by the rays may be. Therefore, by increasing the number of element images as the user's position becomes further away from the center C30, it is possible to maintain the clarity of the element images as seen by the user.

By the controller 113 repeatedly executing steps S211 to S216, the user can listen to the speech of other users while watching a video of virtual space images including a 3D model of the other user.

The procedures in FIGS. 2A and 2B are executed in parallel, e.g., in a time-shared manner, respectively, so that users can interact with other users using terminal apparatus 12 by viewing each other's 3D models in a virtual event. In this case, the controller 113 can increase or decrease the number of element images to be generated according to the user's position, thereby eliminating the unnecessary processing load. Furthermore, it is possible to maintain the clarity of the element images. Thus, the processing related to the display of the stereoscopic images can be made even more efficient.

While embodiments have been described with reference to the drawings and examples, it should be noted that various modifications and revisions may be implemented by those skilled in the art based on the present disclosure. Accordingly, such modifications and revisions are included within the scope of the present disclosure. For example, the functions or the like included in each means, each step, or the like can be rearranged without logical inconsistency, and a plurality of means, steps, or the like can be combined into one or divided.

The invention claimed is:

1. A method performed by a controller of a terminal apparatus, the method comprising:
controlling an imager of the terminal apparatus to capture an image of a user;
controlling a display including a display plane of the terminal apparatus to output light rays constituting respective element images of a plurality of viewpoint positions with respect to a stereoscopic image for displaying the stereoscopic image, toward each viewpoint position; and
controlling the display to output light rays constituting a first number of element images when a distance of the user from the display plane in a first direction perpendicular to the display plane, which is obtained from the captured image of the user, is a first distance, and to output light rays constituting a second number of element images when the distance of the user from the display plane in the first direction is a second distance larger than the first distance, the second number being smaller than the first number.

2. The method according to claim 1, further comprising controlling the display to output light rays constituting a third number of element images when a distance of the user from a center of the display plane in a second direction parallel to the display plane, which is obtained from the captured image, is a third distance, and to output light rays constituting a fourth number of element images when the distance of the user from the center of the display plane in the second direction is a fourth distance larger than the third distance, the fourth number being greater than the third number.

3. The method according to claim 1, further comprising transmitting information for generating a 3D model representing the user based on the captured image via a communication interface of the terminal apparatus to another terminal apparatus, so that the another terminal apparatus displays an image including the 3D model on a display of the another terminal apparatus.

4. A non-transitory computer readable medium storing a program causing a controller of a terminal apparatus to perform operations, the operations comprising:
controlling an imager of the terminal apparatus to capture an image of a user;
controlling a display including a display plane of the terminal apparatus to output light rays constituting respective element images of a plurality of viewpoint positions with respect to a stereoscopic image for displaying the stereoscopic image, toward each viewpoint position; and
controlling the display to output light rays constituting a first number of element images when a distance of the user from the display plane in a first direction perpendicular to the display plane, which is obtained from the captured image of the user, is a first distance, and to output light rays constituting a second number of element images when the distance of the user from the display plane in the first direction is a second distance larger than the first distance, the second number being smaller than the first number.

5. The non-transitory computer readable medium according to claim 4, wherein the operations further comprise controlling the display to output light rays constituting a third number of element images when a distance of the user from a center of the display plane in a second direction parallel to the display plane, which is obtained from the captured image, is a third distance, and to output light rays constituting a fourth number of element images when the distance of the user from the center of the display plane in the second direction is a fourth distance larger than the third distance, the fourth number being greater than the third number.

6. The non-transitory computer readable medium according to claim 4, wherein the operations further comprise transmitting information for generating a 3D model representing the user based on the captured image via a communication interface of the terminal apparatus to another terminal apparatus, so that the another terminal apparatus displays an image including the 3D model on a display of the another terminal apparatus.

7. A terminal apparatus comprising:
an imager configured to capture an image of a user;
a display including a display plane configured to output light rays constituting respective element images of a plurality of viewpoint positions with respect to a stereoscopic image for displaying the stereoscopic image, toward each viewpoint position; and
a controller configured to control the display to output light rays constituting a first number of element images when a distance of the user from the display plane in a first direction perpendicular to the display plane, which is obtained from the captured image of the user, is a first distance, and to output light rays constituting a second number of element images when the distance of the user from the display plane in the first direction is a second distance larger than the first distance, the second number being smaller than the first number.

8. The terminal apparatus according to claim 7, wherein the controller is configured to control the display to output light rays constituting a third number of element images when a distance of the user from a center of the display plane in a second direction parallel to the display plane, which is obtained from the captured image, is a third distance, and to output light rays constituting a fourth number of element images when the distance of the user from the center of the display plane in the second direction is a fourth distance larger than the third distance, the fourth number being greater than the third number.

9. The terminal apparatus according to claim 7, further comprising a communication interface configured to communicate with another terminal apparatus,
wherein the controller is configured to transmit information for generating a 3D model representing the user based on the captured image via the communication interface to the another terminal apparatus, so that the another terminal apparatus displays an image including the 3D model on a display of the another terminal apparatus.

* * * * *